Oct. 21, 1941.　　T. M. CUNNINGHAM　　2,259,737
DUCT CONSTRUCTION
Filed July 14, 1939
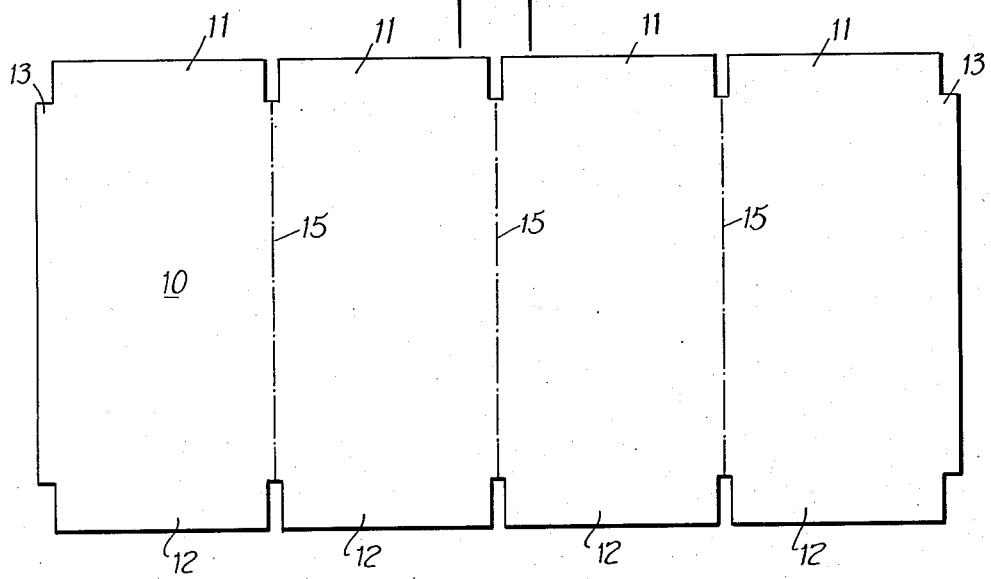
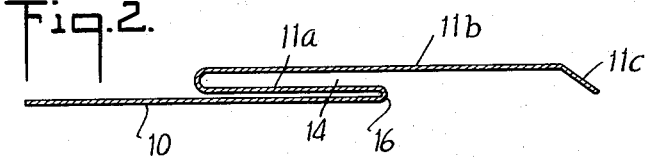
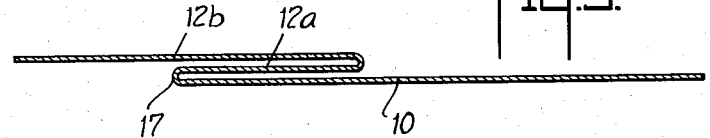
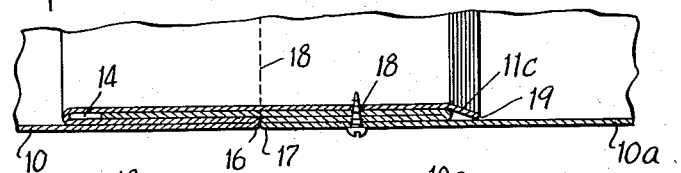
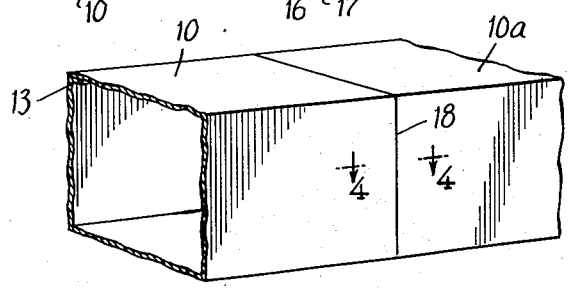
INVENTOR
THOMAS M. CUNNINGHAM
BY
ATTORNEY Patented Oct. 21, 1941

2,259,737

UNITED STATES PATENT OFFICE 2,259,737

DUCT CONSTRUCTION

Thomas M. Cunningham, Chicago, Ill., assignor to Carrier Corporation, Syracuse, N. Y., a corporation of Delaware Application July 14, 1939, Serial No. 284,394

1 Claim. (Cl. 285—201)

This invention relates to the construction of ducts and the like, and more particularly to the construction of ducts or conduits used in conveying air or other gases in ventilating or air conditioning systems.

In fabricating ductwork for ventilating and air conditioning installations, it is generally necessary that the ducts be formed of various sections which are joined together longitudinally to provide the requisite length of passageway. While in the past there have been devised and used various methods of joining together the different duct sections, the joint constructions heretofore available have been characterized by an unsightliness which has often proven a major objection to the installation of ducts in areas intended to present an attractive appearance. Thus, in stores, restaurants, offices and the like, air ducts have often marred the appearance of otherwise attractive rooms; and in many instances the proprietors of stores, restaurants and the like have forgone the advantages of air conditioning rather than suffer the unsightly appearance of ductwork as heretofore constructed. In many installations, of course, the ductwork has been "furred in" but this procedure is time-consuming and costly.

The general object of the present invention is to provide an improved method of and means for joining together various sections of ductwork or the like, in such manner that the finished ductwork presents an attractive and finished appearance, and in which the joints may almost completely escape the attention of observers, the exterior of the assembled duct providing a substantially smooth continuous surface.

It is another object of the invention to provide an improved method of and means for joining together various sections of ductwork or the like, by means of which air-tight and durable joints are formed.

It is another object of the invention to provide an improved joint construction for ducts or the like, which is inexpensive and simple.

It is another object of the invention to provide an improved joint construction for joining together various sections of ducts or the like, which may readily be fabricated in the field with assurance of uniformly satisfactory results.

Other objects, features and advantages of the invention will be more apparent from the following description, to be read in connection with the accompanying drawing, in which:

Fig. 1 is a plan view of a blank used in forming a duct section in accordance with the invention;

Fig. 2 diagrammatically illustrates the manner in which the tabs at one end of the blank of Fig. 1 are bent;

Fig. 3 diagrammatically illustrates the manner in which the tabs at the opposite end of the blank of Fig. 1 are bent;

Fig. 4 is a view taken on the line 4—4 of Fig. 5, illustrating the manner in which adjoining ends of different duct sections are connected together in accordance with the invention; and Fig. 5 is a view in perspective of a fragment of a duct comprising sections assembled in accordance with the invention.

Referring now to the drawing, the numeral 10 designates a blank adapted for use in fabrication of a single section of a four-sided duct constructed in accordance with the invention. One side of the blank 10 is provided with a plurality of tabs 11, while the opposite side of the blank is provided with a plurality of tabs 12. Since a four-sided duct is to be formed by means of the blank 10, four tabs 11 and four tabs 12 are provided. The other extremities of the blank 10 are provided with sealing tabs 13 which are adapted to overlie each other when the blank 10 is folded so as to provide a four-sided duct section. While only one blank 10 is shown, it is to be understood that the invention contemplates the use of a plurality of such blanks, each of which is formed into a duct section, the duct sections then being connected together in the manner hereinafter explained.

Each tab 11 is folded or bent in the manner illustrated in Fig. 2. Thus, the portion 11a of the tab which immediately extends from the body of the blank 10 is folded back upon the main portion 10 in close contact therewith. The remaining portion of the tab 11, designated 11b, is then reverse folded so as to provide a space 14 between the portion 11a and the portion 11b. The portion 11b extends beyond the edge of the main body of the blank 10, and the end portion thereof, 11c, is bent downwardly toward the plane of the main body section of blank 10.

Each tab 12 of each blank 10 is folded in the manner indicated in Fig. 3. Thus the portion 12a which immediately adjoins the main body portion of the blank 10, is folded back upon the body portion in intimate contact therewith, and the remainder of the tab 12 is reverse folded to provide a portion 12b, a part of which is adjacent the portion 12a and the remainder of which extends beyond the extremity of the main body portion of the blank 10.

After the tabs 11 and 12 have been folded as just described, each blank 10 is folded along the lines 15 indicated in Fig. 1, to provide four-sided duct sections. The different sections to be joined are then brought into abutting relationship with each other so that each folded tab portion 11 of one duct section is opposite a folded tab portion 12 of the adjoining section, and the tab portions are then caused to intermesh as shown in Fig. 4. Thus the extending part of the tab portion 12b is received within the space 14 formed by the folded tab 11, and the end 16 of the main body portion of one duct section is caused to abut the end 17 of the main body portion of the adjoining duct section. This interlocking of the tab sections may be effected manually in a very simple manner, due to the flexibility of the tab sections and the simple manner in which they are interconnected. The intermeshing of the tab sections is accomplished at each of the four sides of the duct, and then, if desired, sheet metal screws or the like, as indicated at 18, may be inserted to secure together the intermeshing construction thus formed.

Fig. 5 illustrates a duct comprising a plurality of sections assembled in accordance with the invention. The left hand duct section is indicated at 10, while the right hand duct section is designated 10a. It will be observed that merely a thin line of jointure 18 is visible at the joint. This line, representing the seam between the abutting edges 16 and 17 of the adjacent sections, is barely perceptible, and all of the duct sealing construction is contained within the interior of the duct where it is not visible. Accordingly, after a duct which has been constructed in accordance with the invention has been painted, there is little to suggest that the structure is in fact a duct; rather the structure appears to be a beam, the surface of which is smooth and continuous throughout. Such a duct, far from being objectionable, often enhances the appearance of areas in which it is disposed. And it will be noted that this result is achieved without the necessity for furring in the duct, as has heretofore been done at considerable expense in installations where the final appearance of the duct was a matter of importance.

The interfolding of the tab sections of the adjacent duct sections provides an air-tight joint, and this is further insured by the bending of the tab portion 11c in such manner that it bears against the body portion of the adjoining duct section as indicated at 19 in Fig. 4. If desired, a small amount of cement or the like may be used to caulk the seam 18, to insure against any possibility of air leakage. This cementitious material may be allowed to dry and set, and may then be smoothed out with a suitable abrasive.

Further, if desired, the duct as formed may be coated with a fabric covering, as of canvas, which may be pasted or similarly secured to the outer surfaces of the duct, and then painted.

As will be understood, the overlapping tab portions 13 may be secured together in any desired manner in accordance with conventional practice.

Since many changes may be made in the invention without departing from the scope thereof, it is intended that all matter set forth in the above description, or shown in the accompanying drawing, be regarded as illustrative only and not in a limiting sense.

I claim:

A duct construction including a plurality of duct sections, each duct section having a plurality of sides, each side having an extension, each extension being folded inwardly to form a double layer of material within the duct section with a third layer folded thereover and positioned substantially half in said duct section and half protruding beyond said duct section, adjacent duct sections being assembled with said double layers of respective extensions abutting each other, the third layers of said respective extensions being arranged in superposed position above the abutting layers, whereby substantially a smooth outer seam between respective sides of adjacent duct sections is produced, with four layers of material at the seam within the assembled sections, said superposed layers of material extending across the abutting edges and into each end of the assembled sections with substantially equal layers of material on each side of each seam to prevent sagging of assembled adjacent sections and form an air-tight seal at the seam.

THOMAS M. CUNNINGHAM.